United States Patent [19]

Estabrook

[11] Patent Number: 5,267,915

[45] Date of Patent: Dec. 7, 1993

[54] PLANETARY WHEEL DRIVE ASSEMBLY

[75] Inventor: Dale L. Estabrook, Fort Wayne, Ind.

[73] Assignee: Auburn Gear, Inc., Auburn, Ind.

[21] Appl. No.: 937,275

[22] Filed: Aug. 31, 1992

[51] Int. Cl.$^5$ .................... F16H 1/28; F16D 11/04
[52] U.S. Cl. ................... 475/269; 475/298; 192/67 R
[58] Field of Search ............ 74/15.69; 475/331, 269, 475/298; 403/1; 192/114 T, 67 R

[56] References Cited

U.S. PATENT DOCUMENTS

| | | | |
|---|---|---|---|
| 3,459,070 | 8/1969 | Holdeman | 475/337 |
| 3,504,563 | 4/1970 | Polak | 192/67 R |
| 4,043,226 | 8/1977 | Buuck | 475/331 X |
| 4,327,821 | 5/1982 | Telford | 192/67 R X |
| 4,453,852 | 6/1984 | Gilcrest | 403/1 |
| 4,491,037 | 1/1985 | Bullock | 475/331 X |
| 4,692,049 | 9/1987 | Engle | 403/1 |

FOREIGN PATENT DOCUMENTS 2103735 2/1983 United Kingdom ............... 475/369

Primary Examiner—Leslie A. Braun
Assistant Examiner—Khoi Q. Da
Attorney, Agent, or Firm—Pearne, Gordon, McCoy & Granger

[57] ABSTRACT

A planetary drive assembly for a vehicle is disclosed which includes a wheel mounting spindle. A stationary mounting hub surrounds a portion of the spindle and is fixed to the frame of a vehicle. Wheel bearings are provided between the hub and the spindle which permit rotation of the wheel mounting spindle relative to the mounting hub. A power input shaft is axially mounted with respect to an axial opening in the mounting spindle, and a planetary gear train is provided between the power input shaft and the mounting spindle. A coupling gear is provided between the planetary gear train and the spindle which is adapted to selectively connect and disconnect the spindle to and from the planetary gear train and the power input so that the spindle is capable of being disconnected from the power source and the gear train. When the vehicle is towed, therefore, it may be towed at normal highway speeds since rotation of the spindle does not cause rotation of the gear train.

3 Claims, 2 Drawing Sheets

PLANETARY WHEEL DRIVE ASSEMBLY

BACKGROUND OF THE INVENTION

This invention relates to a planetary drive assembly and, more particularly, to a planetary wheel drive assembly which permits the ground-engaging wheel to be disconnected from the power train so that the wheel may be free-wheeling for travel at highway speeds without driving the gears which are part of the power train to the wheel.

Industrial, off-road and agricultural equipment include individually powered high torque wheels so that the wheels are provided with smooth, infinitely variable power for both forward and reverse operations and for supplying power to individual wheels according to need. Typically, these vehicles include a hydraulic motor for each wheel, although the power source may be pneumatic, electric or mechanical. Rotational power is supplied to each wheel through a planetary gear train which may be connected or disconnected from the power source.

Prior art arrangements for engaging and disengaging a powered wheel from its source include arrangements which are set forth in U.S. Pat. Nos. 3,459,070; 4,453,852; and 4,692,049. In U.S. Pat. No. 3,459,070, there is disclosed a wheel drive mechanism which includes a drive shaft and a sun gear which drives a driving wheel through a planetary gear set. In order to facilitate towing of the vehicle, an access cover is provided which may be removed for removal of the driving sun gear. While the removal of the sun gear disconnects the gear train from the drive shaft, the gear train is rotated by the towing action. Thus, the vehicle may only be towed at low speeds since high speed towing would cause the gears to churn the oil to such a degree that dangerous heat levels would be attained in the gear train. U.S. Pat. Nos. 4,453,852 and 4,692,049 are improvements in the arrangement disclosed in U.S. Pat. No. 3,459,070, in that these patents disclose mechanisms to disengage the sun gear from the drive shaft by quick disconnect mechanisms. Since the gear train is still associated with the ground-engaging wheel, oil churning during towing is still a problem.

SUMMARY OF THE INVENTION

This invention provides a mechanism for disconnecting the ground-engaging wheel from its power source and from its planetary gear train so that the vehicle may be towed at normal highway speeds. According to this invention, a wheel drive assembly includes a wheel mounting spindle having an axial opening therethrough. A stationary mounting hub surrounds a portion of the spindle and is fixed to the frame of a vehicle. Wheel bearings are provided between the hub and the spindle which permit rotation of the wheel mounting spindle relative to the mounting hub. A power input shaft is axially mounted with respect to the axial opening, and a planetary gear train is provided between the power input shaft and the wheel mounting spindle. A coupling gear is provided between the planetary gear train and the spindle which is adapted to selectively connect and disconnect the spindle to and from the planetary gear train and the power input so that the spindle is capable of being disconnected from the power source and the gear train. When the vehicle is towed, therefore, it may be towed at normal highway speeds since rotation of the spindle does not cause rotation of the gear train.

DETAILED DESCRIPTION OF THE INVENTION

Figure 1:
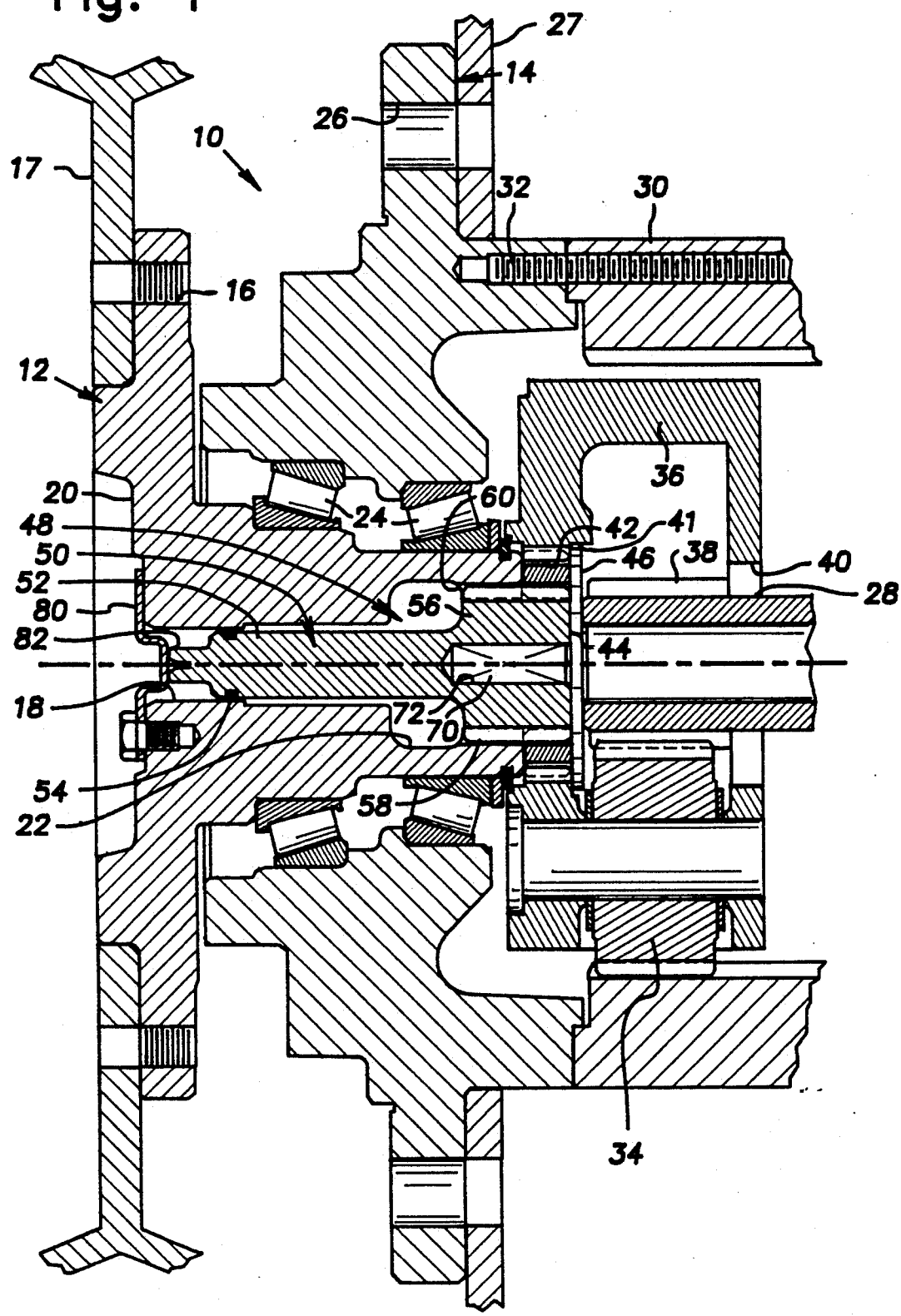
FIG. 1 is a longitudinal sectional view through a wheel drive assembly, according to this invention, showing the wheel mounting spindle engaged with the power train.

Referring now to the drawings, there is illustrated a planetary drive assembly 10 having a wheel mounting spindle 12 and a stationary mounting hub 14. The spindle 12 is provided with bolt or stud Openings 16 so that a wheel rim 17 may be mounted thereon. The spindle 12 is also provided with an axial opening 18 therethrough which communicates with a recess 20 at one end and a counterbore 22 at its other end. A set of roller bearings 24 are provided between the hub 14 and the spindle 12 to permit rotation of the spindle 12 relative to the hub.

The hub 14 is provided with a plurality of mounting apertures 26 so that the hub may be securely attached to the frame 27 of a vehicle. The hub 14 provides a housing for a power transmission train from an axially mounted power input shaft 28 to the spindle 12. The power input shaft 28 is rotatably powered by a suitable power source (not shown), such as a hydraulic motor. The power transmission train includes a stationary ring gear 30 which is fixed to the hub 14 by bolts 32. A plurality of pinion gears 34 (typically three in number) are rotatably mounted on a carrier 36 and are in meshing engagement with the stationary ring gear 30. The pinion gears are driven by a sun gear 38 mounted on the input shaft 28. The carrier 36 has axial openings 40 and 41 therethrough, and the opening 41 is provided with a plurality of gear teeth 42 which receive an intermediate gear 44. The teeth 42 lock the gear 44 for axial rotation with the carrier 36, and a thrust washer 46 is provided to retain one face of the gear 44 and to close one of the openings 40 in the intermediate carrier 36.

The carrier 36 and the intermediate gear 44 are rotatable relative to the spindle 12 but may be locked to the spindle for co-rotation by a linkage mechanism 48 to selectively connect and disconnect the spindle 12 to and from the power transmission train so that the spindle 12 may be freely rotated without transmitting rotational power through the power transmission when the linkage mechanism 48 is disconnected. The linkage mechanism 48 comprises a coupling shaft 50 which has a reduced neck portion 52 slidably received in the axial bore 18 and which is provided with an O-ring seal 54 to prevent lubricant leakage. The coupling shaft 50 also includes an enlarged head portion 56 having splines 58 on its periphery which is received in the counterbore 22 of the spindle 12. The splines 58 engage splines 60 in the counterbore 22, and the coupling shaft is axially shiftable from the position illustrated in FIG. to the position illustrated in FIG. 2 so that, as is illustrated in FIG. 2, the splines 58 may disconnect the splines 60 from splines 62 in the gear 44.

With the splines 60 and 62 coupled together by the splines 58, the carrier 36 and the spindle 12 are linked for rotational movement. Thus, power from the input shaft 28 may be transferred to the spindle 12. Obviously, although a single stage planetary arrangement is illustrated, multiple stages may be provided, as is well-known in the art.

Figure 2:
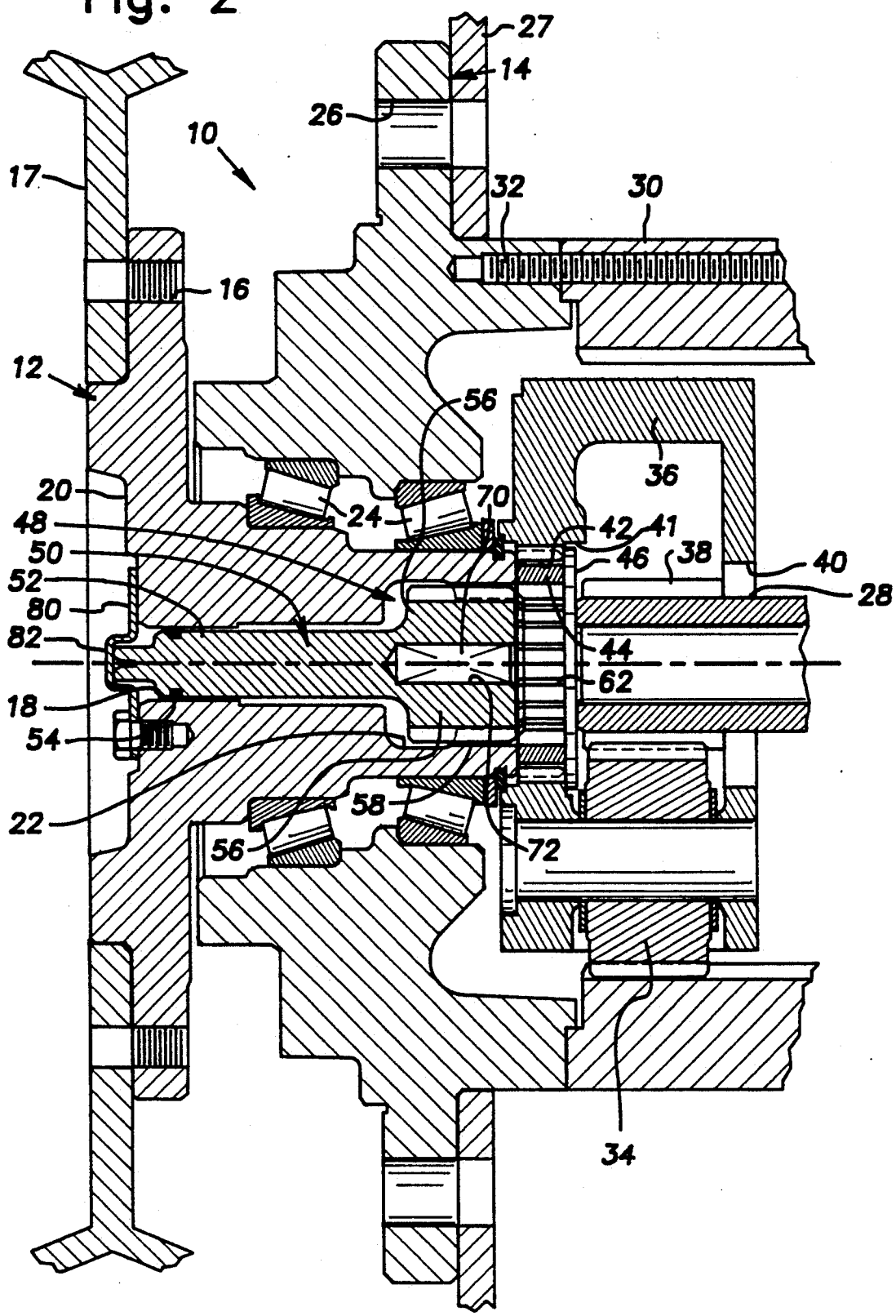
FIG. 2 is a view similar to FIG. 1 but showing the spindle disengaged from the power train.

With the coupling shaft shifted to the position illustrated in FIG. 2 and with the splines 58 out of engagement with the splines 62, the spindle 12 becomes freewheeling in its bearings 24, and the vehicle may be towed at normal highway speeds.

The coupling shaft 50 is biased to the position illustrated in FIG. 2 by a spring 70 which is mounted in a bore 72 in the head portion 56 and which bears against the thrust washer 46.

The spindle includes a cover 80 bolted thereto. The cover 80 comprises a reversible disengaging plate having a hollow, or cup-like projection 82. With the plate mounted in the position illustrated in FIG. 2, the shaft 52 is shifted by the spring 70 so that the spindle is freewheeling. As is illustrated in FIG. 1, it may be noted that the cover 80 is reversed so that the cup-like projection 82 retains the coupling shaft in a shifted position against the bias of the spring to lock the spindle 22 to the carrier so that the spindle may be powered by the power train.

Although the preferred embodiments of this invention have been shown and described, it should be understood that various modifications and rearrangements of the parts may be resorted to without departing from the scope of the invention as disclosed and claimed herein.

What is claimed is:

1. A planetary drive assembly comprising a wheel mounting spindle having an axial opening therethrough, a wheel mounted on said spindle for rotation therewith, a stationary mounting hub surrounding a portion of said spindle and being adapted to be mounted on a frame of a vehicle, wheel bearing means between said hub and said spindle permitting rotation of said wheel mounting spindle relative to said stationary mounting hub, power input shaft means axially mounted with respect to said axial opening, power transmission means between said power input shaft means and said wheel mounting spindle adapted to transmit rotary motion from said power input shaft to said spindle, said power transmission means comprising a planetary gear train including said power input shaft, a sun gear driven by said power input shaft, planetary pinion gear means mounted in a gear carrier and being in meshing engagement with said sun gear, a ring gear mounted on said stationary mounting hub, said planetary pinion gear means also being in meshing engagement with said ring gear, linkage means between said spindle and said power transmission means to selectively connect and disconnect said spindle to and from said power transmission means, said linkage means comprising a plurality of radially directed spline teeth extending inwardly from said carrier, a plurality of radially directed spline teeth extending inwardly from a counterbore in said axial opening through said spindle, said spline teeth associated with said carrier and said counterbore being axially aligned, and a coupling shaft having a neck portion slidable within said axial opening and a head portion slidable within said counterbore, said head portion having outwardly directed radial splines adapted to slidingly engage the spline teeth associated with said carrier and the spline teeth of said counterbore, said head portion being slidable between a retracted position within said counterbore wherein its splined teeth are out of engagement with said spline teeth associated with said carrier and an extend position wherein its spline teeth engage the spline teeth of said counterbore and the spline teeth associated with said carrier, whereby said spindle may be freely rotated without transmitting resultant rotational power through said transmission means when said linkage means is disconnected.

2. A wheel drive assembly according to claim 1, including spring means biasing said head portion to said retracted position.

3. A wheel drive assembly according to claim 1, including locking means to retain said head portion in said extended position against the bias of said spring means.

* * * * *